United States Patent [19]

Kalopissis et al.

[11] 4,031,263
[45] June 21, 1977

[54] MANUFACTURE OF FOOD POWDERS

[75] Inventors: Gregoire Kalopissis, Paris; Guy Vanlerberghe, Montjay-la-Tour, both of France

[73] Assignee: Societe Anonyme dite: L'Oreal, Paris, France

[22] Filed: July 9, 1974

[21] Appl. No.: 486,918

Related U.S. Application Data

[63] Continuation-in-part of Ser. No. 268,454, July 3, 1972, abandoned, which is a continuation of Ser. No. 882,720, Dec. 5, 1969, abandoned.

[30] Foreign Application Priority Data

Sept. 12, 1968 Luxembourg .................. 57499

[52] U.S. Cl. .................. 426/588; 426/471; 426/580; 426/585; 426/654
[51] Int. Cl.$^2$ .................. A23C 9/00
[58] Field of Search .......... 426/156, 174, 185, 187, 426/189, 191, 202, 227, 356, 358, 453, 471, 580, 585, 588, 654; 260/615, 611

[56] References Cited

UNITED STATES PATENTS

| | | | |
|---|---|---|---|
| 2,089,569 | 8/1937 | Orthner et al. | 260/615 B |
| 2,258,892 | 10/1941 | Harris | 260/615 |
| 3,060,030 | 10/1962 | Obenauf et al. | 426/187 X |
| 3,291,614 | 12/1966 | Tumerman et al. | 426/187 X |
| 3,522,054 | 7/1970 | Cavroy et al. | 426/358 |
| 3,578,719 | 5/1971 | Kalopissis et al. | 260/611 |
| 3,632,352 | 1/1972 | Muller et al. | 426/189 X |

Primary Examiner—David M. Naff
Attorney, Agent, or Firm—Cushman, Darby & Cushman

[57] ABSTRACT

The water dispersibility of a reconstitutable food powder such as powdered milk is improved by adding to the powdered food during its manufacture a non-toxic surface active agent which is a fatty alcohol derivative having the formula RO$\{C_2H_3O\ (A)\}$-n H wherein A represents —CH$_2$OH and $n$ has a value of 2–10 or A represents —CH$_2$OCH$_2$ CHOHCH$_2$OH and $n$ has a value of 1–5, R is selected from alkyl, alkenyl C or carbonyl alkenyl groups and each of the alkyl and alkenyl groups is a straight chain having 8–22 carbons. When manufacturing milk powders, the non-ionic surface active agent also exhibits outstanding anti-foaming qualities.

4 Claims, No Drawings

MANUFACTURE OF FOOD POWDERS

CROSS-REFERENCE TO RELATED APPLICATIONS

The present application is a continuation-in-part of application Ser. No. 268,454, filed July 3, 1972 now abandoned, which in turn is a continuation of application Ser. No. 882,720, filed Dec. 5, 1969, now abandoned.

The disclosures of these earlier applications are expressly incorporated herein by reference.

The present invention relates to the use of a non-ionic surface active agent having the following general formula in the manufacture of more hydrophile and lipophile food powders in general and particularly in the manufacture of milk powders:

$$RO\ \text{---}(C_2H_3O\ (A)\ \text{---})_n H$$

In this formula A represents either a $-CH_2OH$ group, in which case $n$ has a statistical value of 2 to 10 inclusive and preferably between 3 and 6 inclusive, or a $-CH_2OCH_2CHOH\ CH_2OH$ group in which case $n$ has a statistical value of 1 to 5 inclusive, and R represents an alkyl, alkenyl, carbonyl alkyl or carbonyl alkenyl radical, which have a straight chain and 8 to 22 carbon atoms.

The compounds in which A is $-CH_2OH$ are described in U.S. Pat. No. 3,578,719. The compounds in which A is $-CH_2OCH_2CHOH\ CH_2OH$ are described in application Ser. No. 763,359, filed Sept. 27, 1968, now abandoned.

The milk powder is prepared by homogenizing the milk to be treated as completely as possible, atomizing the milk, and then treating it in accordance with conventional methods. It is moreover necessary that the whole milk powder, skim milk powder or reconstitutable milk powder which is prepared in this way have the ability to readily redisperse at the moment of use, that is to say that it be easily wetted by water so as to produce reconstituted milk without any lumps in it as rapidly as possible.

In general, better homogenization is obtained by adding an emulsifier which is acceptable to or compatible with the milk to be treated, and which also facilitates the coating of the fatty particles with casein so that they are better protected against oxidation.

However, the products actually used as emulsifiers, such as lecithins, the monoglycerides, and the sucroglycerides are all products which have lipophile tendencies and their hydrophilic properties are weak. It follows that use of these products cannot substantially improve the emulsification of the fatty substances contained in the milk since the principle phase of the milk is an aqueous phase.

For the same reasons, milk powders prepared in this manner do not disperse rapidly because they are not easily wetted by the aqueous dispersing medium. This is true in various degrees depending on whether the powders are made from whole milk, skim milk or reconstituted milk.

These remarks apply particularly to reconstituted milk that is used for feeding livestock, such as skimmed milks into which tallow has been introduced to replace the original fatty substances.

It is accordingly the object of the present invention to use compounds having the above formula in the manufacture of milk powders because these compounds have, in addition to other valuable properties, the remarkable property of being both good emulsifiers and at the same time good wetting agents, despite the presence of long alkyl chains containing 16 to 22 carbon atoms. The best wetting agents heretofore used have moderate to short carbon chains. Moreover the compounds used in the present invention are not toxic.

It has been further surprisingly and unexpectedly discovered that the compounds herein disclosed exhibit outstanding anti-foaming qualities when used in the manufacture of milk powders and give a product which does not have the objectionable property of giving rise to stable foams when reconstituted for use.

The use of these surface active compounds is therefore particularly appropriate for the purpose of the invention, that is to say the preparation of a food powder such as a milk powder which may be easily dispersed at the moment of use, without impairment of the other qualities requisite for a milk powder.

Thus, especially in order to take biological considerations into account, and for reasons of storage or utilization, the ROH alcohols used in the preparation of the surface active agents used in the present invention have the following characteristics:

an iodine number between 30 and 95;
a melting point below 50° C.

We have found that in view of their hydrophilic character and their properties as emulsifiers and wetting agents, these surface activating compounds can be used quite generally in the manufacture of alimentary powders which are to be dispersed in water, and particularly in the manufacture of milk powders for animal consumption or for human consumption for dietetic or medical purposes, or of other powdered products which may or may not be food powders that are to be dispersed in an aqueous solution.

These compounds are very valuable wetting agents for use in the redispersion of the milk powder regardless of the manner in which this powder has been prepared, but they are equally useful at the time of preparation itself because of their emulsifying and anti-foaming properties.

In effect, in the case of the preparation of a milk powder for human consumption from whole milk, the introduction of these compounds into the milk at the moment of homogenization considerably facilitates such homogenization and in particular facilitates the coating of the particles of fatty matter with casein which, during drying and storage, are thus protected against oxidation. When a skimmed milk powder is being prepared for human use, the compounds used in the present invention are equally useful, especially with respect to the rapid redispersion of the milk powder.

In the case of reconstituted milk for animal consumption the compounds used in the present invention are equally valuable because they permit an appropriate choice from a very large range depending upon the fatty matter which is to be reintroduced as a replacement product into the milk. Milks for animal consumption may, for example, be reconstituted with tallow but equally well with other fatty materials depending on what is commercially available, and it is then very advantageous to be able to choose an appropriate additive from a range of surface active agents according to the invention by taking into account its melting point and its iodine index.

The particles of fatty matter in the milk itself may be coated either directly or indirectly. In the first case when the milk powders are to be prepared from whole milk or skimmed milk the surface active agent is simply dissolved in the aqueous phase and the milk is then dried by atomization or spray drying in the usual manner. In the case of a reconstitutable milk made from skimmed milk, which may be concentrated by evaporation, an aqueous solution of the non-ionic surface active agent to be used is first prepared. This is, in general, water soluble, at least when hot, and this solution is added to the milk to be treated, after which the fatty matter is added, while still stirring, at a temperature of 50°–70° C. This fatty matter may consist of tallow, lard, palm oil, copra, peanut oil, or any like fatty material. This produces an emulsion which is treated in a homogenizer and then in an atomizing or spray drying tower to produce the milk powder.

In the second case, the surface active agent, which may by anhydrous or more or less hydrated, is dispersed in the molten fatty matter and then introduced into the skimmed milk while stirring.

The milk powders prepared under these conditions have a dry content comprising 0 to 50% fatty matter and the proportions of surface active agent used in accordance with the invention may vary from 0.1 to 5% by weight of the dry content, which includes both the milk powder and the fat, and preferably from 0.1 to 1%. In general, any emulsifying amount of the emulsifying compound can be used.

The efficacy of the non-ionic surface active agents used during the preparation of the milk powders according to the present invention is demonstrated in the following manner. The percentage of free fatty matter in milk powder which has been treated and milk powder which has not been treated with the aforesaid surface active agents is determined, that is to say the percentage of fatty matter obtained by extracting each of these powders with ligroin or petroleum ether under the same conditions. For this purpose the following milk powders are prepared from the same milk:
A: not treated with the surface active agent used in the invention,
B and C: treated with the surface active agent of the invention at different concentrations.

The surface active agent used is a derivative of a fatty alcohol having the formula:

in which R represents the alkyl radical of an oleocetyl alcohol having the following characteristics:
iodine index: 50–55
hydroxyl index: 210–220
solidification point: 32–36° C The three portions of a milk powder A, B and C were extracted in the following manner:

10 g of the powder is weighed out and introduced into a conical 250 ml flask. 100 ml of ligroin having a boiling point between 35° and 65° is then added while stirring vigorously. The mixture is then left to stand at ambient temperature. After decanting the solid particles the supernatant liquid is withdrawn and filtered on a filter paper. A second extraction is then carried out under the same conditions, using 80 ml of petroleum ether. This is followed by a third extraction using 50 ml of petroleum ether. The three extracts are mixed together and concentrated by evaporation, and then evaporated until dry in a standardized crystallizer. The extracts obtained in this manner may be further dried either in an oven at 100° C or in a vacuum drier until it reaches a constant weight.

The reconstitutable milk used for these tests was a milk powder containing 40% fatty matter in the form of tallow. The comparative results indicated in the following table were obtained:

| Test | Percentage of surface active agent in proportion to fatty matter | Extractable fatty matter as a percentage of the milk powder |
| --- | --- | --- |
| A | 0% | 8.1% |
| B | 0.5% | 0.36% |
| C | 1.0% | 2.6% |

These results show that the presence of the polyglycerol monoalkyl ether surface active agent clearly improved the coating of the fatty matter of the reconstitutable milk powders, with respect to the fatty matter is of the order of 0.5%.

As mentioned above, the compounds disclosed herein are equally effective as anti foaming agents.

The tests below clearly show the superiority of the anti-foaming qualities of the compounds of the present invention in comparison to the dispersing agents of the prior art when used at their optimum emulsifying concentrations.

The following milk powders are used in the tests:
a. A milk powder obtained by atomization of milk refatted to 40% by a fatty material in dry extract, and without any other additive.

b. A milk powder obtained by atomization of a milk refatted to 40% with fatty material (same milk as above) and containing in addition 0.5%, with respect to the fatty material, of an emulsifying agent having the formula:

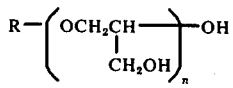

wherein
R represents oleocetyl, i.e. a residue of alkyl fatty acids of tallow, and
n = a statistical average value of 6.

c. A milk powder obtained by atomization of re-fatted milk to 40% (same as a and b) and containing moreover more than 1%, with respect to the fatty material, of glycerol monostearate as an emulsifying agent.

PREPARATION OF DISPERSION

One disperses for each of powders (a), (b) and (c), 5 g of powder in a beaker containing 95 g of water heated to 55° C. The dispersion is agitated for 10 minutes with the aid of a turboagitator regulated to a given speed of rotation.

In the beaker, one introduces ultrasonic sound by means of an ultrasonic generator placed so that its extremity is level with the surface of the liquid.

By emitting ultrasonics a deposition is produced on the surface, which causes the formation of foam.

The time of agitation of the ultrasonics for each test is as follows:
30 seconds at a frequency of 120 cps.
1 minute at a frequency of 180 cps.
Results:

After stopping the agitator, the foam obtained in each of the respective tests after 5 minutes, 20 minutes and 45 minutes is observed.

It is seen that in beaker (b) involving the emulsifiers of the invention, th foam is essentially dispersed at the end of 5 minutes, whereas the foams are substantial in beakers (a) and (c) at the end of 5, 20, and 45 minutes, respectively.

The use of non-ionic surface active agents in accordance with the invention is particularly desirable with respect to dispersing milk powder, but this is a product chosen from a very broad range of possible powders, and the above surface active agents may also be utilized in preparing other food powders which are dispersible in water, such as powders based on cocoa, soluble coffees, and like powders.

The following specific examples are given purely by way of illustration in order that the invention may be more readily understood:

EXAMPLE 1

A milk powder is prepared from a quantity of skimmed milk containing 30 kg of total dry content. For this purpose 200 g of the surface active agent having the following formula is dissolved in water to produce a solution containing 10% of said agent by weight:

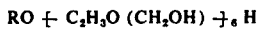

In this formula R represents the alkyl radical obtained from oleocetyl alcohol which has an iodide index of 50–55, a hydroxyl index of 210–220, and a solidification point of 32°–36° C. This solution is added to the milk to be treated. 20 kg of melted tallow is then introduced into the resulting mixture at a temperature of about 60° C, while stirring. The mixture is then homogenized in an apparatus of the Gaulin type and atomization of the homogenized mixture yields a very fine milk powder which disperses in water rapidly. The weight of the surface active agent used was about 1% of the weight of the tallow in the mixture.

The next step is extraction with ligroin using successively 100 ml, 80 ml, and 50 ml of ligroin per 10 g of milk powder, the total quantity of extractable fatty matter being 1.3 kg.

EXAMPLE 2

The procedure followed is the same as Example 1 except that only 100 g of the surface active agent is used. This amounts to 0.5% by weight of the fatty matter. The result is a very fine powder which is easily dispersed in water.

Extracting with ligroin in the same manner as in Example 1 produced a total of 0.180 kg of extractable fatty matter.

EXAMPLE 3

The procedure is the same as in Example 1 except that no molten tallow was added to the mixture. The result is a skimmed milk powder in which the surface active agent constitutes 1% by weight of the dry contents of the milk. The powder dissolves very easily in lukewarm or cold water.

Similar results were obtained using other surface active agents which correspond to the general formula of the surface active agents of this invention.

In reconstituting the milk powders of this invention the same ratio of milk powder to water solution is used that is used in the prior art.

The term "alkyl-carbonyl" radical as used herein means acyl radicals of fatty acids, which may be saturated as in octanoyl-1, decanoyl-1, dodecanoyl-1, tetradecanoyl-1, hexadecanoyl-1 and octadecanoyl-1, or unsaturated as in octa-den- 9-oyl-1, octadecadien-9, 12-oyl-1, octadecatrien-9, 12, 15-oyl-1, or the acyl radical of ricinoleic acid, namely hydroxy-12-octadecen-9-oyl-1.

By the term "oleocetyl", as used herein, is meant a mixture of saturated or unsaturated fatty alcohols obtained from natural fats. Such saturated alcohols include : octanol-1, decanol-2, dodecanol-1, tetradecanol-1, hexadecanol-1, eicosanol-1 and docosadol-1. Such unsaturated alcohols include: oleyl alcohol or octadecen-9-ol-1, as well as polyunsaturated alcohols such as linoleyl alcohol, octadecadiene-9,12-ol-1, and linolenyl alcohol or octadecatinen-9,12,15-ol-1. All these alcohols are found, in varying degrees, in mixtures of fatty alcohols obtained from fats and animal and vegetable oils.

Illustrative emulsifying compounds that may be used are:

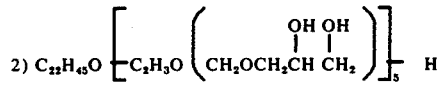

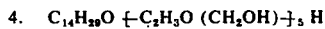

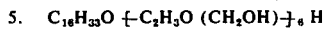

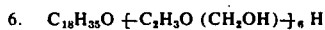

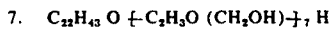

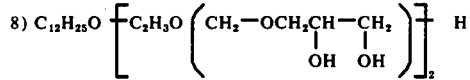

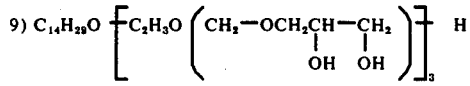

What is claimed is:

1. A process for improving the water dispersibility properties and the anti-foaming properties of powdered reconstitutable milk comprising forming an intimate mixture of fluid milk and a non-ionic surface active agent which is a fatty alcohol derivative having the formula

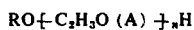

wherein A is selected from the group consisting of —CH$_2$OH and —CH$_2$OCH$_2$CHOHCH$_2$OH, n has a value of 2–10 when A is —CH$_2$OH and a value of 1–5 when A is —CH$_2$OCH$_2$CHOHCH$_2$OH, R is selected from the group consisting of alkyl, alkenyl and carbonyl alkenyl, wherein each of said alkyl and alkenyl groups is a straight chain having 8–22 carbon atoms, the iodide index of R being about 30–95 and the melting point of fatty alcohols from which said derivative is prepared being less than 50° C, said non-ionic surface active agent being present in amounts of about 0.1–5 percent by weight of the total mixture and drying said mixture.

2. The process of claim 1 which includes forming a dispersion of said non-ionic surface active agent with a fatty substance selected from the group consisting of tallow, lard, palm oil, copra oil and peanut oil, said fatty substance being in molten form, intimately mixing the resulting dispersion with said fluid milk and drying the resulting mixture.

3. A dry powdered milk product having improved water dispersibility and anti-foaming properties consisting essentially of an intimate mixture of milk and a non-ionic surface active agent which is a fatty alcohol derivative having the formula $$RO + C_2H_3O (A) +_n H$$

wherein A is selected from the group consisting of —$CH_2OH$ and —$CH_2OCH_2CHOHCH_2OH$, $n$ has a value of 2–10 when A is -13 $CH_2OH$ and a value of 1–5 when A is —$CH_2OCH_2CHOHCH_2OH$, R is selected from the group consisting of alkyl, alkenyl and carbonyl alkenyl, wherein each of said alkyl and alkenyl groups is a straight chain having 8–22 carbon atoms, the iodide index of R being about 30–95 and the melting point of fatty alcohols from which said derivative is prepared being less than 50° C, said non-ionic surface active agent being present in amounts of about 0.1–5 percent by weight of said product.

4. The product of claim 3 which also includes a fatty substance selected from the group consisting of tallow, lard, palm oil, copra oil and peanut oil, the maximum amount of said fatty substance in said product being 50 weight percent of said product.

* * * * *